United States Patent
Harda et al.

(10) Patent No.: US 9,533,643 B2
(45) Date of Patent: Jan. 3, 2017

(54) APPARATUS AND METHOD FOR VEHICLE OCCUPANT PROTECTION IN ROADWAY DEPARTURE

(71) Applicant: VOLVO CAR CORPORATION, Gothenburg (SE)

(72) Inventors: Peter Harda, Torslanda (SE); Anders Axelson, Torslanda (SE); Magnus Bjorklund, Torslanda (SE); Gunnar Bengtsson, Stenkullen (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/560,228

(22) Filed: Dec. 4, 2014

(65) Prior Publication Data

US 2015/0165996 A1 Jun. 18, 2015

(30) Foreign Application Priority Data

Dec. 16, 2013 (EP) ..................................... 13197408

(51) Int. Cl.
*B60R 22/00* (2006.01)
*E05F 15/00* (2015.01)
(Continued)

(52) U.S. Cl.
CPC ......... *B60R 21/0134* (2013.01); *B60N 2/0244* (2013.01); *B60N 2/0276* (2013.01);
(Continued)

(58) Field of Classification Search
CPC ......... B60K 28/14; B60N 2/2884; B60N 2/42; B60R 21/0132; B60R 21/0134; B60W 30/18163
(Continued)

(56) References Cited

U.S. PATENT DOCUMENTS

2007/0185635 A1* 8/2007 Mattes ................ B60N 2/0224
701/45
2010/0280718 A1 11/2010 Hashimoto et al.
(Continued)

FOREIGN PATENT DOCUMENTS

| EP | 2594439 | 5/2013 |
|---|---|---|
| GB | 2340454 | 2/2000 |
| JP | 10138809 A * | 5/1998 |

OTHER PUBLICATIONS

Extended European Search Report for EP 131974081 , Completed by the European Patent Office, Dated Jun. 5, 2014, 8 Pages.

*Primary Examiner* — Maceeh Anwari
(74) *Attorney, Agent, or Firm* — Brooks Kushman P.C.

(57) ABSTRACT

A method and apparatus are disclosed for vehicle occupant protection in unintentional roadway departure by a vehicle having at least one vehicle seat with a seat cushion mounted on a seat frame, the height of which is adjustable through a motor operated height adjustment device. Vehicle travel is monitored using a remote sensor and/or a vehicle dynamics sensor. The remote sensor detects edges of the road. The vehicle dynamics sensor determines vehicle dynamics parameters. Road edge signals and/or vehicle dynamics signals are processed to determine whether the vehicle is about to leave the road. Operation of the height adjustment device to move a seat cushion towards a crash-position is triggered in response to an off-road signal indicating that the vehicle is about to leave the road.

20 Claims, 3 Drawing Sheets

(51) Int. Cl.
    *G05D 1/00*     (2006.01)
    *G05D 3/00*     (2006.01)
    *G06F 3/00*     (2006.01)
    *G06F 7/00*     (2006.01)
    *B60R 21/0134*     (2006.01)
    *B60R 21/0132*     (2006.01)
    *B60N 2/02*     (2006.01)
    *B60N 2/16*     (2006.01)
    *B60N 2/42*     (2006.01)
    *B60N 2/427*     (2006.01)
    *B60R 21/01*     (2006.01)

(52) U.S. Cl.
    CPC ............. *B60N 2/16* (2013.01); *B60N 2/4242* (2013.01); *B60N 2/4279* (2013.01); *B60N 2/42736* (2013.01); *B60R 21/0132* (2013.01); *B60R 2021/01252* (2013.01); *B60R 2021/01272* (2013.01)

(58) Field of Classification Search
    USPC .......................................................... 701/45
    See application file for complete search history.

(56) References Cited

U.S. PATENT DOCUMENTS

2013/0300165 A1    11/2013    Fehring et al.
2013/0321627 A1    12/2013    Turn, Jr. et al.

\* cited by examiner

APPARATUS AND METHOD FOR VEHICLE OCCUPANT PROTECTION IN ROADWAY DEPARTURE

CROSS-REFERENCE TO RELATED APPLICATIONS

This application claims foreign priority benefits under 35 U.S.C. §119(a)-(d) to European patent application number EP 13197408.1, filed Dec. 16, 2013, which is incorporated by reference in its entirety.

TECHNICAL FIELD

Embodiments herein relate to an apparatus and method for vehicle occupant protection in unintentional roadway departure as well as an automotive vehicle that comprises such an apparatus.

BACKGROUND

Today active-safety systems, such as collision avoidance systems with automated braking and lane keeping assistants with automated steering, provide for increased safety during vehicle travel.

One type of system, with a potentially large positive impact on accident statistics, is a Forward Collision Avoidance System (FCAS). An FCAS uses sensors based on technologies such as RADAR (RAdio Detection And Ranging), LIDAR (LIght Detection And Ranging), LASER (Light Amplification by Stimulated Emission of Radiation) and cameras to monitor the region in front of the host vehicle. In the FCAS a tracking algorithm is used to estimate the state of the objects ahead and a decision algorithm uses the estimated states to determine any action, such as e.g. warning a driver or performing autonomous braking of the vehicle.

However, even if such active-safety systems keep getting better and better, limitations in such systems and also limitations set by the laws of physics will sometimes make accidents, such as unintentional roadway departure, unavoidable. There is of course a risk of serious consequences should a collision occur between one's own vehicle and objects aside the road. Collisions with such objects also often occur at significant speeds, why the risk for structural damages to the vehicle is substantial.

One type of impact, with potentially serious consequences for vehicle occupants, is when a vehicle leaves the road and suffers an impact to the floor of the vehicle, e.g. hits a rock or boulder after departing from the road. Such an impact to the underside of the floor of the vehicle may cause vehicle occupants serious lower spine injuries and may even lead to fatalities.

SUMMARY

Embodiments herein aim to provide an apparatus for vehicle occupant protection in unintentional roadway departure.

This is provided through an apparatus for vehicle occupant protection in unintentional roadway departure, comprising: at least one of a remote sensor and a vehicle dynamics sensor, the remote sensor when present arranged to monitor a road travelled by a vehicle hosting the apparatus and to at least detect edges of the road and output road edge signals representative thereof, and the vehicle dynamics sensor when present arranged to determine one or more vehicle dynamics parameters of the host vehicle and output vehicle dynamics signals representative thereof; a processing device arranged to process at least one of the road edge signals and the vehicle dynamics signals to determine whether the host vehicle is about to leave the road and to output an off-road signal in response thereto; at least one vehicle seat with a seat cushion mounted on a seat frame, the height of which is adjustable through a motor operated height adjustment device; a triggering device arranged to trigger operation of the motor operated height adjustment device to move the seat cushion towards a crash-position in response to the off-road signal indicating that the host vehicle is about to leave the road.

The provision of moving the seat cushion towards a crash-position in response to the off-road signal indicating that the host vehicle is about to leave the road provides for improved vehicle occupant protection in unintentional roadway departure as the seat frame thus better can absorb impact forces if the vehicle suffers an impact to the floor.

According to a second aspect is provided that the apparatus comprises at least one remote sensor which further is arranged to monitor the surroundings of the host vehicle to detect potential collision objects and in that the processing device further is arranged to determine whether the host vehicle is likely to impact a detected potential collision object with a floor thereof should it leave the road and to only output the off-road signal in response to such a determination.

The provision of only outputting the off-road signal in response to determining that the host vehicle floor is likely to impact a detected potential collision object makes the arrangement less intrusive to a vehicle occupant, as seat adjustment is only triggered when required.

According to a third aspect is provided that the triggering device is arranged to trigger operation of the motor operated height adjustment device to move the seat cushion to a position as remote from the floor of the host vehicle as allowed by the height adjustment device in response to the off-road signal.

The provision of moving the seat cushion to a position as remote from the floor of the host vehicle as allowed by the height adjustment device in response to the off-road signal, ensures that an as large as possible deformation distance between the vehicle floor and the seat cushion of the vehicle seat is available to absorb impact forces in case of a floor impact accident.

According to a fourth aspect is provided that the triggering device is arranged to trigger operation of the motor operated height adjustment device to move the seat cushion to a crash-optimized position for the seat frame with respect to the floor of the host vehicle in response to the off-road signal.

The provision of moving the seat cushion to a crash-optimized position for the seat frame with respect to the floor of the host vehicle in response to the off-road signal, provides for optimal use of a vehicle seat frame deformation capabilities when the seat frame is designed having such a crash-optimized position.

According to a fifth aspect is provided that the crash-optimized position for the seat frame with respect to the floor of the host vehicle is arranged as a center-position of a seat cushion height adjustment range allowed by the height adjustment device.

The provision of arranging the crash-optimized position as a center-position of a seat cushion height adjustment range allowed by the height adjustment device, still further improves time required to perform movement to the crash-optimized position.

According to a sixth aspect is provided that the apparatus comprises at least one remote sensor which comprises one or more sensors arranged to monitor areas forward, to the rear and to the sides of the host vehicle.

The provision of monitoring areas forward, to the rear and to the sides of the host vehicle, still further improves the ability to assess the surroundings of the vehicle to detect objects that potentially could impact the floor thereof should the vehicle unintentionally leave the road.

According to a seventh aspect is provided that the apparatus comprises at least one remote sensor which comprises at least one of a RADAR technology sensor, a LIDAR technology sensor, a LASER technology sensor, a vision technology sensor, an ultrasound technology sensor, an infrared technology sensor or fusions of sensors based on one or more of these sensing technologies.

Basing the at least one remote sensor on at least one of a RADAR technology sensor, a LIDAR technology sensor, a LASER technology sensor, a vision technology sensor, an ultrasound technology sensor, an infrared technology sensor or fusions of sensors based on one or more of these sensing technologies, as described for the seventh aspect, provides for high confidence sensor data for judgment whether the vehicle is about to unintentionally leave the road and potentially suffer a collision impact to the floor thereof.

According to an eight aspect is provided that the apparatus comprises at least one vehicle dynamics sensor which comprises at least one of a velocity sensor, an accelerometer sensor, a gyroscopic sensor and a supplemental restraint system sensor.

Basing the at least one vehicle dynamics sensor on at least one of a velocity sensor, an accelerometer sensor, a gyroscopic sensor and a supplemental restraint system sensor, still further improves the ability to determine if the host vehicle is about to leave the road.

According to a ninth aspect the triggering device further is arranged to trigger operation of a reversible restraint system of the host vehicle to perform tensioning of seat belts of the host vehicle in response to the off-road signal indicating that the host vehicle is about to leave the road.

Performing tensioning of seat belts of the host vehicle in response to the off-road signal indicating that the host vehicle is about to leave the road helps ensure correct pre-impact positioning of a vehicle occupant should the vehicle suffer a collision impact to the floor thereof.

Further embodiments herein aim to provide a method for vehicle occupant protection in unintentional roadway departure by a vehicle that comprises at least one vehicle seat with a seat cushion mounted on a seat frame, the height of which is adjustable through a motor operated height adjustment device.

This is provided through a method comprising the steps of: monitoring, using at least one of a remote sensor and a vehicle dynamics sensor, at least one of a road travelled by a vehicle hosting the apparatus to at least detect edges of the road and one or more vehicle dynamics parameters of the host vehicle and outputting at least one of road edge signals and vehicle dynamics signals representative thereof; processing, using a processing device, at least one of the road edge signals and the vehicle dynamics signals to determine whether the host vehicle is about to leave the road and to outputting an off-road signal in response thereto; triggering, using a triggering device, operation of the motor operated height adjustment device to move the seat cushion towards a crash-position in response to the off-road signal indicating that the host vehicle is about to leave the road.

The provision of triggering movement of the seat cushion towards a crash-position in response to the off-road signal indicating that the host vehicle is about to leave the road provides for a reduction of the risk of vehicle occupants suffering serious lower spine injuries in unintentional roadway departure as the seat frame thus better can absorb impact forces if the vehicle suffers an impact to the floor.

According to a final aspect is provided an automotive vehicle which comprises an apparatus for vehicle occupant protection in unintentional roadway departure as above.

An automotive vehicle which comprises an apparatus for vehicle occupant protection in unintentional roadway departure as above provides for improved safety for vehicle occupants in unintentional roadway departure, and especially provides for a reduction of the risk of vehicle occupants suffering serious lower spine injuries.

BRIEF DESCRIPTION OF THE DRAWINGS

In the following, embodiments herein will be described in greater detail by way of example only with reference to below drawings.

Figure 1:
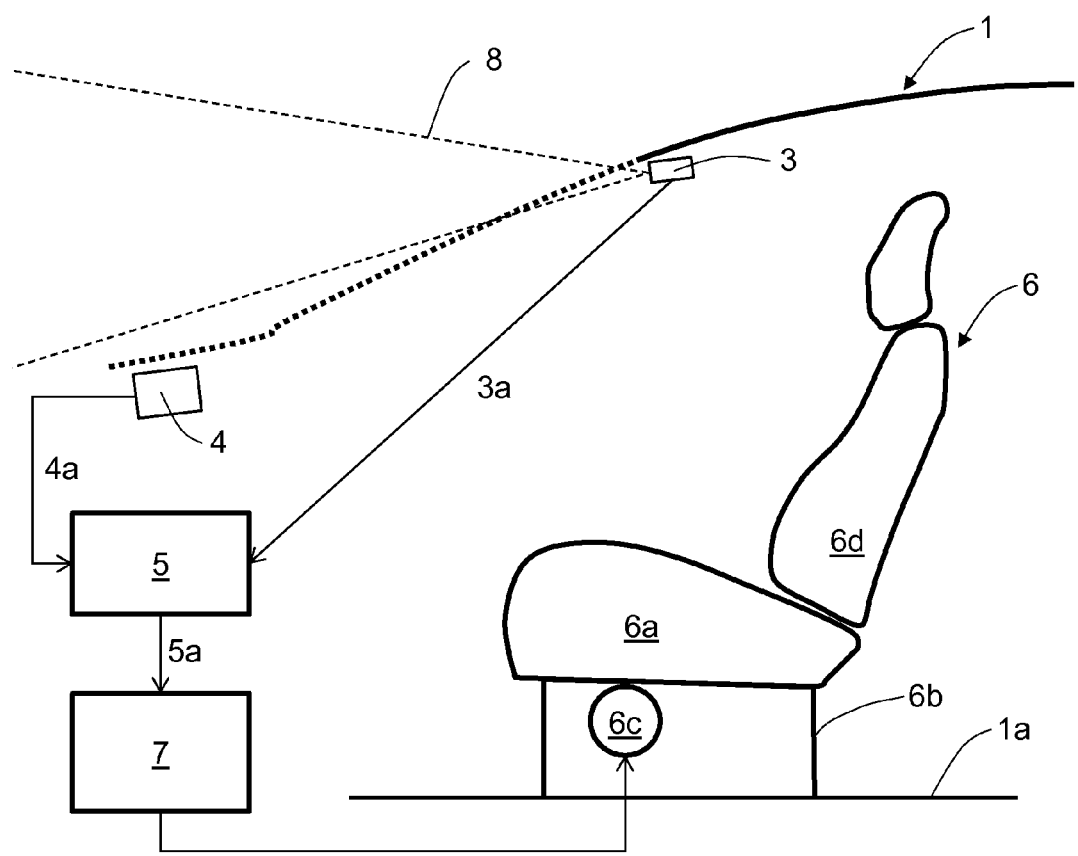
FIG. 1 is a schematic illustration of an apparatus for vehicle occupant protection in unintentional roadway departure according to embodiments herein.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The Figures are not necessarily to scale. Some features may be exaggerated or minimized to show details of particular components. Therefore, specific structural and functional details disclosed herein are not to be interpreted as limiting, but merely as a representative basis for teaching one skilled in the art.

In overview, embodiments herein, utilizes conventional motor operated height adjustment devices 6c for vehicle seats 6 in order to provide improved safety for vehicle occupants 2 in the specific type of accident where a vehicle 1 leaves the road 9 and suffers an impact to the floor 1a of the vehicle 1, which otherwise may cause vehicle occupants 2 serious lower spine injuries and even may lead to fatalities.

Motor operated height adjustment devices 6c for vehicle seats 6 as used herein incorporates electro-motor operated, pneumatic-motor operated and hydraulic-motor operated height adjustment devices 6c for vehicle seats 6.

An apparatus for vehicle 1 occupant 2 protection in unintentional roadway departure is illustrated in FIG. 1. At least one of a remote sensor 3 and a vehicle dynamics sensor 4 is provided. The at least one remote sensor 3, when present, is arranged to monitor a road 9 travelled by a vehicle 1 hosting the apparatus and to at least detect edges of the road 9 and output road edge signals 3a representative thereof.

Remote sensing is the acquisition of information about an object 10 without making physical contact with the object 10. As used herein, the term generally refers to the use of aerial sensor technologies to detect and classify objects by means of propagated signals 8.

The at least one vehicle dynamics sensor 4, when present, is arranged to determine one or more vehicle dynamics parameters of the host vehicle 1 and output vehicle dynamics signals 4a representative thereof.

A processing device 5 is arranged to process at least one of the road edge signals 3a and the vehicle dynamics signals 4a to determine whether the host vehicle 1 is about to leave the road 9 and to output an off-road signal 5a in response thereto. The processing device 5 suitably comprises a processing unit, such as a computer processor, and appropriate software for controlling operation thereof.

Thus, determination that the host vehicle 1 is about to leave the road 9 is made either from the detected road edges, via the road edge signals 3a, or from detected vehicle dynamics indicating that the host vehicle 1 is about to leave the road 9, via the vehicle dynamics signals 4a, or from a combination of these and possibly additional vehicle signals.

At least one vehicle seat 6 has a seat cushion 6a mounted on a seat frame 6b, the height of which is adjustable through a motor operated height adjustment device 6c. A triggering device 7, which may be a thyristor device, electronic circuit, or any other known triggering device, is arranged to trigger operation of the motor operated height adjustment device 6c to move the seat cushion 6a towards a crash-position in response to the off-road signal 5a indicating that the host vehicle 1 is about to leave the road 9.

Such a crash-position will be at least somewhat raised from the floor 1a of the vehicle 1, in order to ensure that a sufficient deformation distance between the vehicle floor and the seat cushion 6a of the vehicle seat 6 is available in case of a floor 1a impact accident. Thus, the supporting element of the seat 6 structure, preferably the seat frame 6b, can thus absorb the large impact forces.

In some embodiments hereof the apparatus comprises at least one remote sensor 3 which is further arranged to monitor the surroundings of the host vehicle 1 to detect potential collision objects 10 and the processing device 5 is further arranged to determine whether the host vehicle 1 is likely to impact a detected potential collision object 10 with a floor 1a thereof should it leave the road 9 and to only output the off-road signal 5 in response to such a determination.

Figure 2:
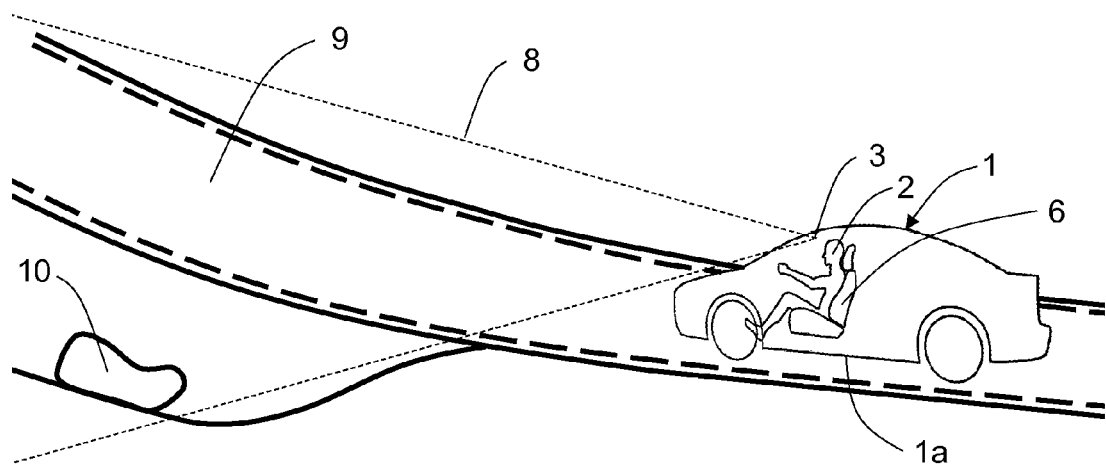
FIG. 2 is a schematic illustration of a vehicle comprising an apparatus according to FIG. 1 about to suffer an unintentional roadway departure according to embodiments herein.

FIG. 2 is a schematic illustration of a vehicle 1 comprising an apparatus for vehicle 1 occupant 2 protection in unintentional roadway departure according to FIG. 1, which is about to suffer an unintentional roadway departure and impact a rock or boulder 10 after departing from the road 9.

Figure 3:
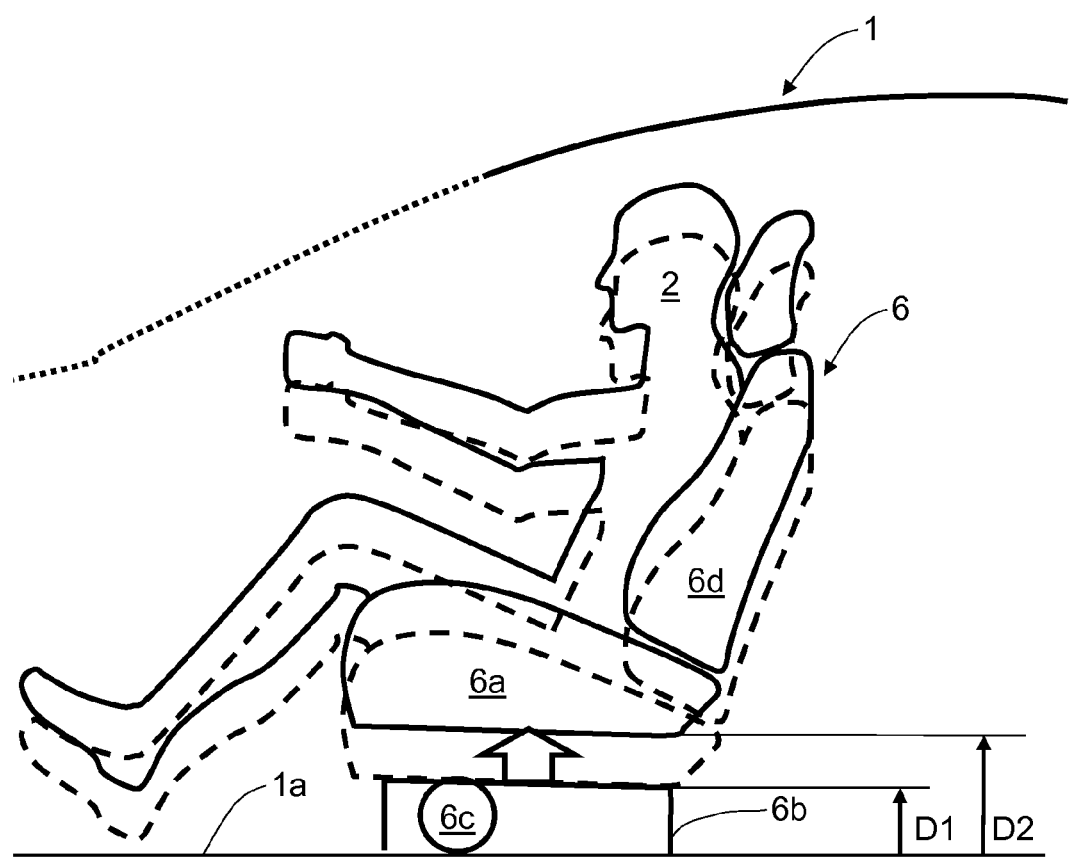
FIG. 3 is a schematic illustration of a vehicle seat with an occupant in a normal travel position as well as a raised crash-position according to embodiments herein.

FIG. 3 is a schematic illustration of a vehicle seat 6 with an occupant 2 in a normal travel position D1 as well as a raised crash-position D2 according to embodiments herein.

For such embodiments where the seat frames 6b of the vehicle seats 6 provide their best ability to absorb impact forces in a position as elevated from the floor 1a of the vehicle 1 as possible, the triggering device 7 is, as illustrated in FIG. 3, arranged to trigger operation of the motor operated height adjustment device 6c to move the seat cushion 6a from a current position D1 to a position D2 as remote from the floor 1a of the host vehicle 1 as allowed by the height adjustment device 6c in response to the off-road signal 5a.

For other embodiments, where the seat frames 6b of the vehicle seats 6 provide their best ability to absorb impact forces in another position the triggering device 7 is arranged to trigger operation of the motor operated height adjustment device 6c to move the seat cushion 6a from a current position D1 to a crash-optimized position for the seat frame 6b with respect to the floor 1a of the host vehicle 1 in response to the off-road signal 5a.

In some such embodiments, e.g. where the vehicle seat 6 position is calibrated such that an absolute seat position is known, the crash-optimized position for the seat frame 6b with respect to the floor 1a of the host vehicle 1 is arranged as a center-position of a seat cushion 6a height adjustment range D1-D2 allowed by the height adjustment device 6c. Thus, in these embodiments operation of the motor operated height adjustment device 6c is triggered to move the seat cushion 6a towards an optimal height for spine protection, which may have been previously determined through at least one of crash-tests, simulations, calculations or statistics relevant for vehicle floor 1a impact collisions involving vehicles of the same type as the host vehicle 1. Having a crash-optimized position as a center-position of a seat cushion 6a height adjustment range D1-D2 allowed by the height adjustment device 6c further reduces the time required to perform movement to the crash-optimized position, as compared to embodiments where the seat cushion 6a is moved to a position D2 as remote from the floor 1a of the host vehicle 1 as allowed by the height adjustment device 6c.

In order to provide an ability to assess the surroundings of the vehicle to detect objects 10 that potentially could impact the floor 1a of the vehicle 1 should the vehicle 1 unintentionally leave the road 9 the apparatus, according to some embodiments herein, comprises at least one remote sensor 3 which comprise one or more sensors arranged to monitor areas forward, to the rear and to the sides of the host vehicle 1.

In embodiments hereof the apparatus comprises at least one remote sensor 3 which comprises at least one of a RADAR (RAdio Detection And Ranging) technology sensor, a LIDAR (LIght Detection And Ranging) technology sensor, a LASER (Light Amplification by Stimulated Emission of Radiation) technology sensor, a vision technology sensor (camera), an ultrasound technology sensor, an infrared technology sensor or fusions of sensors based on one or more of these sensing technologies.

Examples of such fusion sensors are integrated Radar and Camera (RACam) System sensors. RACam Systems combines radar sensing, vision sensing and performs data fusion of the information acquired by such sensors for obtaining highly reliable decision support. Thus, information from fused sensors may be utilized to improve the confidence of the decision to trigger operation of at least one of the motor operated height adjustment device 6c of the vehicle seats 6.

As a minimum it is envisaged that the at least one remote sensor 3 is a camera based vision sensor. In accordance with such an embodiment is provided for a low cost implementation of the apparatus for vehicle 1 occupant 2 protection in unintentional roadway departure.

In such embodiments the camera based vision sensor can comprise at least one of a Charge-Coupled Device (CCD)

camera and a Complementary Metal-Oxide Semiconductor (CMOS) camera. Such cameras are technically proven and readily available, even as fairly low cost components.

In some embodiments hereof the apparatus comprises at least one vehicle dynamics sensor 4 which comprise at least one of a velocity sensor, an accelerometer sensor, a gyroscopic sensor and a supplemental restraint system sensor. These sensors may be located in a Restraints Control Module (RCM) or provided at separate locations throughout the vehicle 1.

It is also possible to supplement all of the above embodiments through further arranging the triggering device 7 to trigger operation of a reversible restraint system (not shown) of the host vehicle 1 to perform tensioning of seat belts (not shown) of the host vehicle 1 in response to the off-road signal 5a indicating that the host vehicle 1 is about to leave the road 9.

Performing tensioning of seat belts of the host vehicle 1 in response to the off-road signal 5a indicating that the host vehicle 1 is about to leave the road 9 helps ensure correct pre-impact positioning of a vehicle occupant 2 should the vehicle 1 suffer a collision impact to the floor 1a thereof.

In accordance with the above described embodiments is achieved a pre-crash adjustment of the vehicle seat 6 height which helps protect vehicle occupants 2 from lower spine injuries or at least reduce the effects therefrom.

According to the present application is also envisaged a method for vehicle occupant 2 protection in unintentional roadway departure by a vehicle 2 that comprises at least one vehicle seat 6 with a seat cushion 6a mounted on a seat frame 6b, the height of which is adjustable through a motor operated height adjustment device 6c, which method comprises the following steps:

monitoring, using at least one of a remote sensor 3 and a vehicle dynamics sensor 4, at least one of a road 9 travelled by a vehicle 1 hosting the apparatus to at least detect edges of the road 9 and one or more vehicle dynamics parameters of the host vehicle 1, and outputting at least one of road edge signals 3a and vehicle dynamics signals 4a representative thereof;

processing, using a processing device 5, at least one of the road edge signals 3a and the vehicle dynamics signals 4a to determine whether the host vehicle 1 is about to leave the road 9 and to outputting an off-road signal 5a in response thereto; and triggering, using a triggering device 7, operation of the motor operated height adjustment device 6c to move the seat cushion 6a towards a crash-position in response to the off-road signal 5a indicating that the host vehicle 1 is about to leave the road 9.

According to one embodiment of the method the step of monitoring further comprises monitoring the surroundings of the host vehicle 1 to detect potential collision objects 10 and, the step of processing further comprises determining whether the host vehicle 1 is likely to impact a detected potential collision object 10 with a floor 1a thereof should it leave the road 9 and only outputting the off-road signal 5 in response to such a determination. This step makes the method less intrusive to a vehicle occupant, as vehicle seat 6 adjustment is only triggered when required.

In other embodiments the step of triggering further comprises triggering operation of the motor operated height adjustment device 6c to move the seat cushion 6a to a position D2 as remote from the floor 1a of the host vehicle 1 as allowed by the height adjustment device 6c in response to the off-road signal 5a.

Triggering movement of the seat cushion 6a to a position D2 as remote from the floor 1a of the host vehicle 1 as allowed by the height adjustment device 6c in response to the off-road signal 5a, ensures that an as large as possible deformation distance between the vehicle floor 1a and the seat cushion 6a of the vehicle seat 6 is available to absorb impact forces in case of a floor 1a impact accident.

According to alternative embodiments the step of triggering further comprises triggering operation of the motor operated height adjustment device 6c to move the seat cushion 6a to a crash-optimized position for the seat frame 6b with respect to the floor 1a of the host vehicle 1 in response to the off-road signal 5a.

Triggering movement of the seat cushion 6a to a crash-optimized position for the seat frame 6b with respect to the floor 1a of the host vehicle 1 in response to the off-road signal 5a, provides for optimal use of vehicle seat frame 6b deformation capabilities when using a seat frame 6b that is designed having such a crash-optimized position.

According to some such alternative embodiments the step of triggering movement of the seat cushion 6a to the crash-optimized position for the seat frame 6b with respect to the floor 1a of the host vehicle 1 comprises triggering movement of the seat cushion 6a to a center-position of a seat cushion height adjustment range D1-D2 allowed by the height adjustment device 6c.

Moving of the seat cushion 6a to a center-position of a seat cushion height adjustment range D1-D2 allowed by the height adjustment device 6c, makes it possible to rapidly perform movement to the crash-optimized position.

According to further embodiments the step of monitoring comprises monitoring areas forward, to the rear and to the sides of the host vehicle 1.

Through monitoring areas forward, to the rear and to the sides of the host vehicle 1, the ability is improved to assess the surroundings of the vehicle 1 to detect objects 10 that potentially could impact the floor 1a thereof should the vehicle 1 unintentionally leave the road 9.

According to further embodiments the step of triggering comprises trigger operation of a reversible restraint system (not shown) of the host vehicle 1 to perform tensioning of seat belts (not shown) of the host vehicle 1 in response to the off-road signal 5a indicating that the host vehicle 1 is about to leave the road 9.

Performing tensioning of seat belts of the host vehicle 1 in response to the off-road signal 5a indicating that the host vehicle 1 is about to leave the road 9 helps ensure correct pre-impact positioning of a vehicle occupant 2 should the vehicle 1 suffer a collision impact to the floor 1a thereof.

In accordance with the present application is also envisaged an automotive vehicle 1 comprising an apparatus for vehicle 1 occupant 2 protection in unintentional roadway departure as described in the foregoing.

The above-described embodiments may be varied within the scope of the following claims. Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the appended claims. Additionally, the features of various implementing embodiments may be combined to form further embodiments.

What is claimed is:

1. An apparatus for vehicle occupant protection from lower spine injuries in unintentional roadway departure, comprising:
   at least one of a remote sensor and a vehicle dynamics sensor, the remote sensor when present arranged to monitor a road traveled by a vehicle hosting the apparatus and to at least detect edges of the road and output road edge signals representative thereof, and the vehicle dynamics sensor when present arranged to determine one or more vehicle dynamics parameters of the host vehicle and output vehicle dynamics signals representative thereof;
   a processing device arranged to process at least one of the road edge signals and the vehicle dynamics signals to determine whether the host vehicle is about to leave the road and to output an off-road signal in response thereto;
   a vehicle seat with a seat cushion mounted on a seat frame, the height of which is adjustable through a motor operated height adjustment device; and
   a triggering device arranged to trigger operation of the motor operated height adjustment device to move the seat cushion towards a crash-position in response to the off-road signal indicating that the host vehicle is about to leave the road, the crash-position comprising a rear end of the seat cushion at least partially raised from a floor of the vehicle so that a deformation distance between the vehicle floor and the seat cushion of the vehicle seat is available in case of a floor impact accident for vehicle occupant protection from lower spine injuries.

2. The apparatus for vehicle occupant protection of claim 1 wherein the at least one remote sensor further is arranged to monitor surroundings of the host vehicle to detect potential collision objects and wherein the processing device further is arranged to determine whether the host vehicle is likely to impact a detected potential collision object with a floor thereof should it leave the road and to only output the off-road signal in response to such a determination.

3. The apparatus for vehicle occupant protection of claim 1 wherein the triggering device is arranged to trigger operation of the motor operated height adjustment device to move the seat cushion to a position as remote from a floor of the host vehicle as allowed by the height adjustment device in response to the off-road signal.

4. The apparatus for vehicle occupant protection of claim 1 wherein the triggering device is arranged to trigger operation of the motor operated height adjustment device to move the seat cushion to a crash-optimized position for the seat frame with respect to a floor of the host vehicle in response to the off-road signal.

5. The apparatus for vehicle occupant protection of claim 1 wherein the crash-optimized position for the seat frame with respect to a floor of the host vehicle is arranged as a center-position of a seat cushion height adjustment range allowed by the height adjustment device.

6. The apparatus for vehicle occupant protection of claim 1 wherein the at least one remote sensor comprises one or more sensors arranged to monitor areas forward, to the rear and to the sides of the host vehicle.

7. The apparatus for vehicle occupant protection of claim 1 wherein the at least one remote sensor comprises at least one of a RADAR technology sensor, a LIDAR technology sensor, a LASER technology sensor, a vision technology sensor, an ultrasound technology sensor, an infrared technology sensor or fusions of sensors based on one or more of these sensing technologies.

8. The apparatus for vehicle occupant protection of claim 1 wherein the at least one vehicle dynamics sensor comprises at least one of a velocity sensor, an accelerometer sensor, a gyroscopic sensor and a supplemental restraint system sensor.

9. The apparatus for vehicle occupant protection of claim 1 wherein the triggering device further is arranged to trigger operation of a reversible restraint system of the host vehicle to perform tensioning of seat belts of the host vehicle in response to the off-road signal indicating that the host vehicle is about to leave the road.

10. A method for vehicle occupant protection from lower spine injuries in unintentional roadway departure by a vehicle that comprises a vehicle seat with a seat cushion mounted on a seat frame, the height of which is adjustable through a motor operated height adjustment device, the method comprising:
    monitoring, using at least one of a remote sensor and a vehicle dynamics sensor, at least one of a road traveled by a vehicle hosting the apparatus to at least detect edges of the road and one or more vehicle dynamics parameters of the host vehicle, and outputting at least one of road edge signals and vehicle dynamics signals representative thereof;
    processing, using a processing device, at least one of the road edge signals and the vehicle dynamics signals to determine whether the host vehicle is about to leave the road and outputting an off-road signal in response thereto; and
    triggering, using a triggering device, operation of the motor operated height adjustment device to move a seat cushion towards a crash-position in response to the off-road signal indicating that the host vehicle is about to leave the road, the crash-position comprising a rear end of the seat cushion at least partially raised from a floor of the vehicle so that a deformation distance between the vehicle floor and the seat cushion of the vehicle seat is available in case of a floor impact accident for vehicle occupant protection from lower spine injuries.

11. An automotive vehicle comprising an apparatus for vehicle occupant protection in unintentional roadway departure according to claim 1.

12. An apparatus for vehicle occupant protection from lower spine injuries in unintentional roadway departure, the apparatus for use in a vehicle comprising a vehicle seat with a seat cushion mounted on a seat frame, the height of which is adjustable through a motor operated height adjustment device, the apparatus comprising:
    at least one of a remote sensor and a vehicle dynamics sensor, the remote sensor when present arranged to monitor a road traveled by a vehicle hosting the apparatus and to at least detect edges of the road and output road edge signals representative thereof, and the vehicle dynamics sensor when present arranged to determine one or more vehicle dynamics parameters of the host vehicle and output vehicle dynamics signals representative thereof;

a processing device arranged to process at least one of the road edge signals and the vehicle dynamics signals to determine whether the host vehicle is about to leave the road and to output an off-road signal in response thereto; and a triggering device arranged to trigger operation of the motor operated height adjustment device to move the vehicle seat towards a crash-position in response to the off-road signal indicating that the host vehicle is about to leave the road, the crash-position comprising a rear end of the seat cushion at least partially raised from a floor of the vehicle so that a deformation distance between the vehicle floor and the seat cushion of the vehicle seat is available in case of a floor impact accident for vehicle occupant protection from lower spine injuries.

13. The apparatus for vehicle occupant protection of claim 12 wherein the at least one remote sensor further is arranged to monitor surroundings of the host vehicle to detect potential collision objects and wherein the processing device further is arranged to determine whether the host vehicle is likely to impact a detected potential collision object with a floor thereof should it leave the road and to only output the off-road signal in response to such a determination.

14. The apparatus for vehicle occupant protection of claim 12 wherein the triggering device is arranged to trigger operation of the motor operated height adjustment device to move the seat cushion to a position as remote from a floor of the host vehicle as allowed by the height adjustment device in response to the off-road signal.

15. The apparatus for vehicle occupant protection of claim 12 wherein the triggering device is arranged to trigger operation of the motor operated height adjustment device to move the seat cushion to a crash-optimized position for the seat frame with respect to a floor of the host vehicle in response to the off-road signal.

16. The apparatus for vehicle occupant protection of claim 12 wherein the crash-optimized position for the seat frame with respect to a floor of the host vehicle is arranged as a center-position of a seat cushion height adjustment range allowed by the height adjustment device.

17. The apparatus for vehicle occupant protection of claim 12 wherein the at least one remote sensor comprises one or more sensors arranged to monitor areas forward, to the rear and to the sides of the host vehicle.

18. The apparatus for vehicle occupant protection of claim 12 wherein the at least one remote sensor comprises at least one of a RADAR technology sensor, a LIDAR technology sensor, a LASER technology sensor, a vision technology sensor, an ultrasound technology sensor, an infrared technology sensor or fusions of sensors based on one or more of these sensing technologies.

19. The apparatus for vehicle occupant protection of claim 12 wherein the at least one vehicle dynamics sensor comprises at least one of a velocity sensor, an accelerometer sensor, a gyroscopic sensor and a supplemental restraint system sensor.

20. The apparatus for vehicle occupant protection of claim 12 wherein the triggering device further is arranged to trigger operation of a reversible restraint system of the host vehicle to perform tensioning of seat belts of the host vehicle in response to the off-road signal indicating that the host vehicle is about to leave the road.

* * * * *